US012090618B1

(12) United States Patent
Feng

(10) Patent No.: US 12,090,618 B1
(45) Date of Patent: Sep. 17, 2024

(54) TOOL ASSEMBLY

(71) Applicant: ROXON INC., Irvine, CA (US)

(72) Inventor: Sun Feng, Irvine, CA (US)

(73) Assignee: ROXON INC., Irvine, CA (US)

(*) Notice: Subject to any disclaimer, the term of this patent is extended or adjusted under 35 U.S.C. 154(b) by 0 days.

(21) Appl. No.: 18/437,636

(22) Filed: Feb. 9, 2024

Related U.S. Application Data

(63) Continuation-in-part of application No. PCT/CN2023/126985, filed on Oct. 27, 2023.

(30) Foreign Application Priority Data

Sep. 13, 2023 (CN) ......................... 202322494818.0

(51) Int. Cl.
*B25F 1/04* (2006.01)

(52) U.S. Cl.
CPC ..................................... *B25F 1/04* (2013.01)

(58) Field of Classification Search
CPC ... B25F 1/04; B26B 11/00; B26B 5/00; B26B 5/001; B26B 5/002; B26B 5/003
See application file for complete search history.

(56) References Cited

U.S. PATENT DOCUMENTS

| | | | | | |
|---|---|---|---|---|---|
| 4,233,737 | A * | 11/1980 | Poehlmann | B26B 1/046 30/344 |
| 6,721,983 | B2 * | 4/2004 | Dallas | B25F 1/04 7/128 |
| 7,347,128 | B2 * | 3/2008 | Rivera | B25F 1/003 7/128 |
| 7,676,931 | B2 | 3/2010 | Knight et al. | |
| 9,517,569 | B2 | 12/2016 | Elsener | |
| 9,687,987 | B2 | 6/2017 | Bloch et al. | |
| 11,154,973 | B2 | 10/2021 | O'Donnell | |
| 11,279,050 | B2 | 3/2022 | Onion | |
| 11,571,823 | B2 * | 2/2023 | Onion | B26B 1/10 |
| 2006/0070243 | A1 | 4/2006 | Onion et al. | |
| 2017/0282384 | A1 | 10/2017 | Wang, Jr. | |
| 2019/0118395 | A1 * | 4/2019 | Cheng | B26B 5/00 |
| 2019/0202073 | A1 * | 7/2019 | Huang | B26B 1/10 |
| 2021/0245352 | A1 * | 8/2021 | O'Donnell | B25F 1/006 |
| 2022/0134583 | A1 * | 5/2022 | Sung | B26B 1/10 30/165 |

FOREIGN PATENT DOCUMENTS

| | | |
|---|---|---|
| CN | 205497540 U | 8/2016 |
| CN | 105965553 A | 9/2016 |
| CN | 210081525 U | 2/2020 |
| CN | 216803524 U | 6/2022 |
| CN | 218614195 U | 3/2023 |

* cited by examiner

*Primary Examiner* — Hadi Shakeri

(57) ABSTRACT

A tool assembly includes a handle having a first end and a second end, a pivotal shaft mounted in the first end of the handle, at least one implement having a proximal end and a distal end, and a position-limiting mechanism mounted in the handle. The implement may pivot between an unfolded position and a folded position. When the implement is in its unfolded position, the position-limiting mechanism can lock the implement in position. The position-limiting mechanism may be lifted so as to allow the replacement of the implement.

18 Claims, 21 Drawing Sheets

TOOL ASSEMBLY

FIELD OF THE INVENTION

The present invention relates generally to utility tools. More specifically, the present invention is a folding tool that allows for easy and convenient replacement or change of the implement.

BACKGROUND OF THE INVENTION

Existing knives and multi-function tools generally include a handle and one or more implements attached to the handle. The implements may be fixedly attached to the handle. Alternatively, the implements may be rotatably attached to one end of the handle such that the implements may be folded into the handle for storage or unfolded for use.

However, there are some drawbacks associated with the existing tools. For example, the one or more implements are typically irreplaceable. Thus, users are unable to replace worn-out or damaged implements. If multiple tools are required for work, the users are forced to carry a large number of tools. Although there are a few tools that have a replaceable implement, it is inconvenient to replace it. Moreover, the users generally desire that the implement remains in the unfolded position when the implement is being used and that the implement remains in the folded position when it is not being used.

Therefore, it is an objective of the present invention to provide a tool assembly that overcomes the problems set forth above.

SUMMARY OF THE INVENTION

The present invention discloses a tool assembly includes a handle having a first end and a second end, a pivotal shaft mounted in the first end of the handle, at least one implement having a proximal end and a distal end, and a position-limiting mechanism mounted in the handle. The at least one implement comprises a pivotal hole at the proximal end. The pivotal shaft runs through the pivotal hole to attach the at least one implement such that the at least one implement is pivotable about the pivotal shaft between a first position and a second position. The handle comprises a storage compartment to receive the at least one implement in the first position. The position-limiting mechanism comprises a first position-limiting portion. The at least one implement comprises a second position-limiting portion adjacent to the proximal end of the at least one implement. The first position-limiting portion engages the second position-limiting portion to prevent the at least one implement in the second position from pivoting. The pivotal shaft is a D-shaped shaft comprising a flat surface and an arc surface. The pivotal hole is provided with a notch. A width of the notch is smaller than a diameter of the pivotal hole. The diameter of the pivotal hole is equivalent to or slightly greater than a diameter of the pivotal shaft. The width of the notch is equivalent to or slightly greater than a distance from a peak of the arc surface to the flat surface of the pivotal shaft. The position-limiting mechanism is movable to a disengaging position where the first position-limiting portion of the position-limiting mechanism disengages the second position-limiting portion of the at least one implement. The position-limiting mechanism is further movable to a replacement position after the first position-limiting portion of the position-limiting mechanism disengages the second position-limiting portion of the at least one implement, allowing the at least one implement to detach from the pivotal shaft by pivoting to a position where the flat surface of the pivot shaft is parallel with side edges of the notch.

In one embodiment, the position-limiting mechanism comprises a position-limiting body, a through hole, and a pivotal pin, and a biasing member. The position-limiting body has a first end and a second end. The through hole may be positioned closer to the second end of the position-limiting body than the first end of the position-limiting body. The pivotal pin may run through the through hole such that the position-limiting body is rotatable about the pivotal pin, the biasing member may be configured to urge the first end of the position-limiting body towards the at least one implement.

In one embodiment, the first position-limiting portion may be an elongated portion that laterally extends from the first end of the position-limiting body, while the second position-limiting portion may be a groove having a complementary shape to the elongated portion.

In one embodiment, the biasing member may be a torsion spring that is installed on the pivotal pin, with one end engaging the first end of the position-limiting body and with the other end anchored to the handle.

In one embodiment, the tool assembly further comprises a rotating member. The rotating member comprises a pushing portion which pushes the at least one implement away from the storage compartment when the rotating member rotates in a first direction. The pushing portion is further configured to push the position-limiting mechanism to the disengaging position when the rotating member rotates in a second direction and push the position-limiting mechanism to the replacement position when the rotating member rotates further in the second direction.

In one embodiment, the position-limiting mechanism may further comprise a lifting portion configured to engage the pushing portion of the rotating member. The lifting portion may be located between the pivotal pin and the first end of the position-limiting body. The lifting portion may further comprise a locking protrusion configured to hold the rotating member in position when the locking protrusion engages the pushing portion of the rotating member.

In one embodiment, a surface of the pushing portion that engages the locking protrusion and a surface of the locking protrusion may be both arc surfaces.

In one embodiment, the handle may further comprise a position-limiting pin disposed between the position-limiting mechanism and the proximal end of the at least one implement. The position-limiting pin may be further disposed between the first end of the position-limiting body and the locking protrusion of the position-limiting mechanism. A profile surface of the at least one implement may be an arc surface that is concentric with the pivotal shaft.

In one embodiment, the position-limiting mechanism may further comprise an arc groove to accommodate the position-limiting pin.

In one embodiment, the handle may comprise a pair of inner handle plates and a pair of outer handle plates. The pair of inner handle plates may be connected together by a connecting plate. The storage compartment may be formed within the pair of inner handle plates. Each inner handle plate may comprise a D-shaped mounting hole for the pivotal shaft to travel therethrough. Each outer handle plate may be attached to one of the pair of inner handle plates via a screw attached to an end of the pivotal shaft.

In one embodiment, the pair of inner handle plates may further comprise a pivotal pin mounting hole to install the pivotal pin of the position-limiting mechanism.

In one embodiment, the rotating member may be disposed between the pair of inner handle plates and one of the pair of outer handle plates. The rotating member may further comprise a mounting hole through which the pivotal shaft travels. One of the pair of inner handle plates may further comprise a first slot at a location corresponding to the pushing portion of the rotating member.

In one embodiment, the rotating member may further comprise a toggle portion that extends in an opposite direction to the pushing portion of the rotating member. One of the pair of outer handle plates may further comprise a second slot at a location corresponding to the toggle portion of the rotating member.

In one embodiment, an inner diameter of the mounting hole may be greater than the diameter of the pivotal shaft, and the rotating member may further comprise a bearing installed in the mounting hole to facilitate rotation of the rotating member.

In one embodiment, the at least one implement may further comprise a third position-limiting portion at the proximal end of the at least one implement. The first position-limiting portion of the position-limiting mechanism engages the third position-limiting portion of the at least one implement when the at least one implement is in the first position.

In one embodiment, the handle may further comprise a safety mechanism that engages the position-limiting mechanism when the at least one implement is in the first position to hold the position-limiting mechanism in a position that prevents the first position-limiting portion of the position-limiting mechanism from disengaging the third position-limiting portion of the at least one implement.

In one embodiment, the safety mechanism may comprise a sliding plate and a pushing plate. The sliding plate may comprise a sliding slot. The pair of inner handle plates may be provided with a plurality of slide guiding members. The plurality of slide guiding members may be arranged in the sliding slot to allow the sliding plate to slidably coupled to the plurality of slide guiding members. The sliding plate may be movable towards and away from the first end of the handle. The sliding plate may further comprise a stopping portion configured to engage the second end of the position-limiting mechanism when the sliding plate moves towards the first end of the handle and disengage the second end of the position-limiting mechanism when the sliding plate moves away from the first end of the handle.

In one embodiment, the safety mechanism may further comprise a reset spring that provides an elastic force to urge the sliding plate to move towards the first end of the handle.

In one embodiment, the safety mechanism may further comprise a pushing plate that connects to an outer side of the sliding plate, the pushing plate comprises a pushing button. One of the pair of outer handle plates may comprise a third slot at a location corresponding to the pushing button.

In one embodiment, the stopping portion may be inwardly inclined.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

Figure 1:
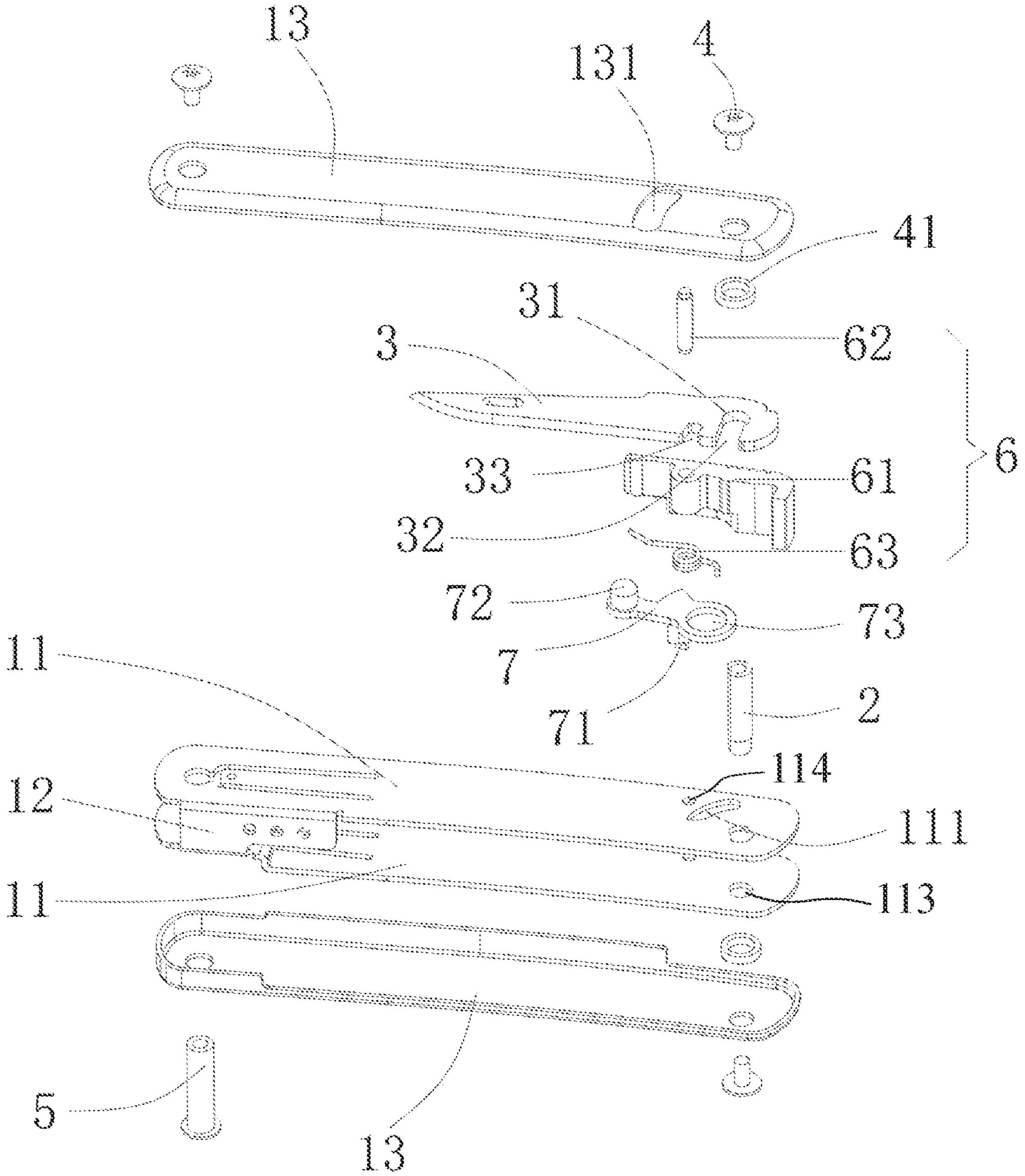
FIG. 1 is a schematic diagram of the exploded structure of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of a utility tool, embodiments of the present disclosure are not limited to use only in this context.

The present invention is a tool assembly. It is an aim of the present invention to provide a tool handle that allows multiple implements to be attached simultaneously. It is another aim of the present invention to stably attach the implements to the handle. It is yet another aim of the present invention to replace the implements easily and conveniently Referring now to the figures of the present disclosure. FIG. 1 is an exploded view illustrating the components of the present invention. The cleaning apparatus of the present invention comprises a handle 1, a pivotal shaft 2, at least one implement 3, and a position-limiting mechanism 6.

Figure 2:
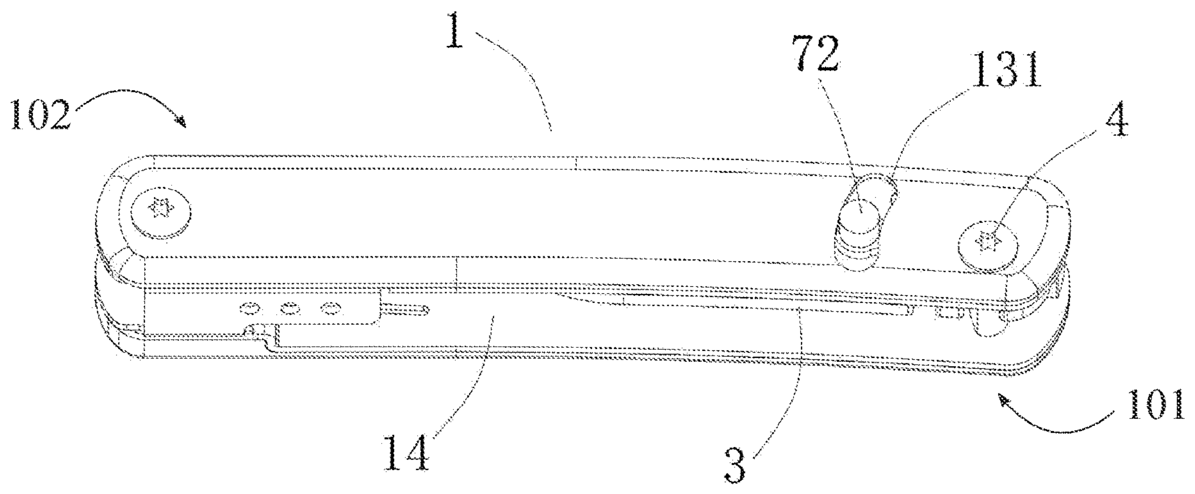
FIG. 2 is a schematic diagram of the assembled structure of the present invention.
Figure 3:
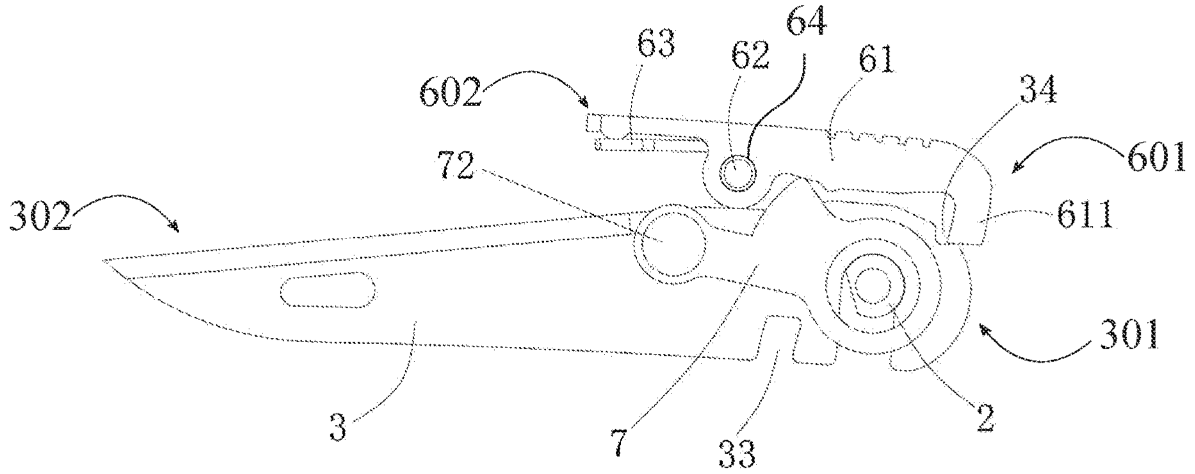
FIG. 3 is a schematic structural diagram of the tool assembly of the present invention, wherein the handle is omitted, and the implement is in the first position.
Figure 4:
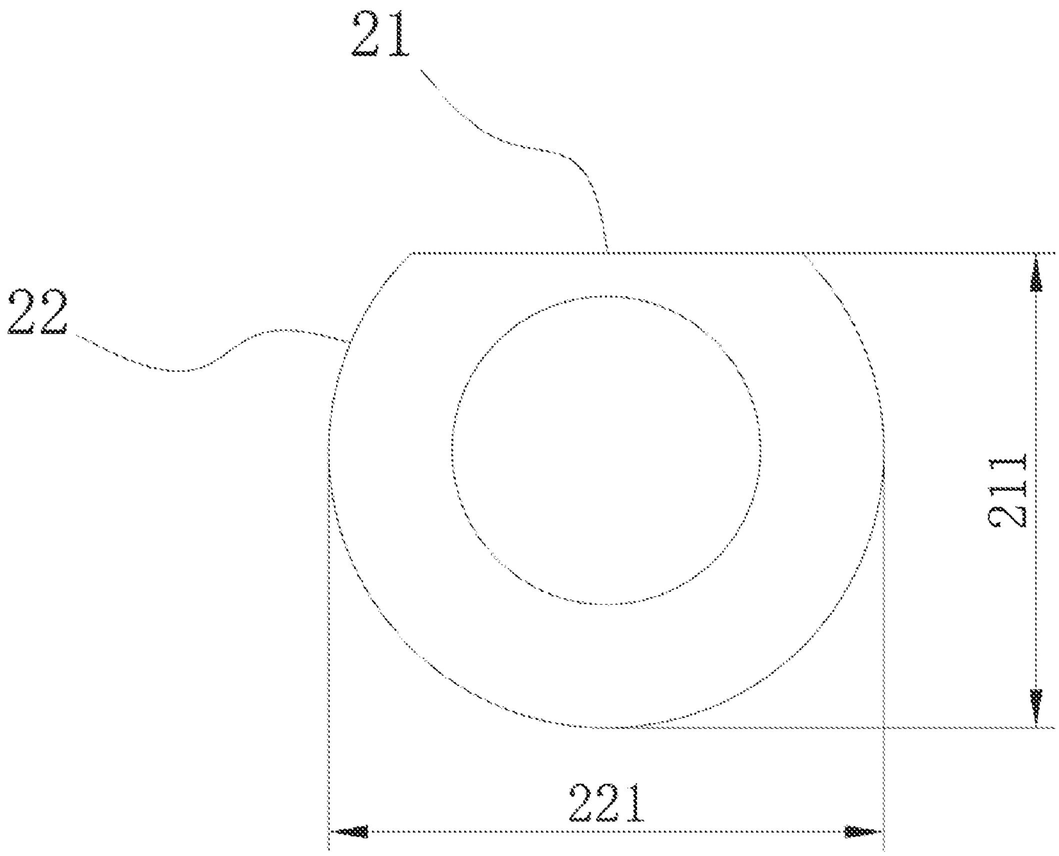
FIG. 4 is a schematic structural diagram of the pivotal shaft of the present invention.

As shown in FIG. 2, the handle 1 has a first end 101 and a second end 102. The pivotal shaft 2 is mounted in the first end 101 of the handle 1. The at least one implement 3 has a proximal end 301 and a distal end 302. The at least one implement 3 comprises a pivotal hole 31 at the proximal end 301. The pivotal shaft 2 runs through the pivotal hole 31 to attach the at least one implement 3. In this way, the at least one implement 3 is pivotable about the pivotal shaft 2 between a first position and a second position. In the illustrated embodiment, the first position is a folded position in which the at least one implement 3 is folded within the handle 1. The at least one implement 3 may rotate about 180 degrees to the second position, which is an unfolded position for use. The handle 1 comprises a storage compartment 14 to receive the at least one implement 3 in the first position.

As shown in FIGS. 1, 3, and 7-13, the position-limiting mechanism 6 is configured to limit the rotary movement of the at least one implement 3. The position-limiting mechanism 6 is mounted in the handle 1. The position-limiting mechanism 6 comprises a first position-limiting portion 611, while the at least one implement 3 comprises a second position-limiting portion 33 adjacent to the proximal end 301 of the at least one implement 3. When the at least one implement 3 is in the second position, the first position-limiting portion 611 engages the second position-limiting portion 33 to prevent the at least one implement 3 from pivoting. In other words, the at least one implement 3 is locked in the second position by the first position-limiting portion 611 engaging the second position-limiting portion 33, so as to allow a user to use the at least one implement 3.

In a preferred embodiment, the at least one implement 3 further comprises a third position-limiting portion 34 at the proximal end 301 of the at least one implement 3. When the at least one implement 3 is in the first position, the first position-limiting portion 611 of the position-limiting mechanism 6 engages the third position-limiting portion 34 of the at least one implement 3 to prevent the at least one implement 3 from accidentally unfolding due to gravity or slight vibration. In the illustrated embodiment, the second position-limiting portion 33 is a relatively deep groove, and the third position-limiting portion 34 is a relatively shallow groove.

Figure 12:
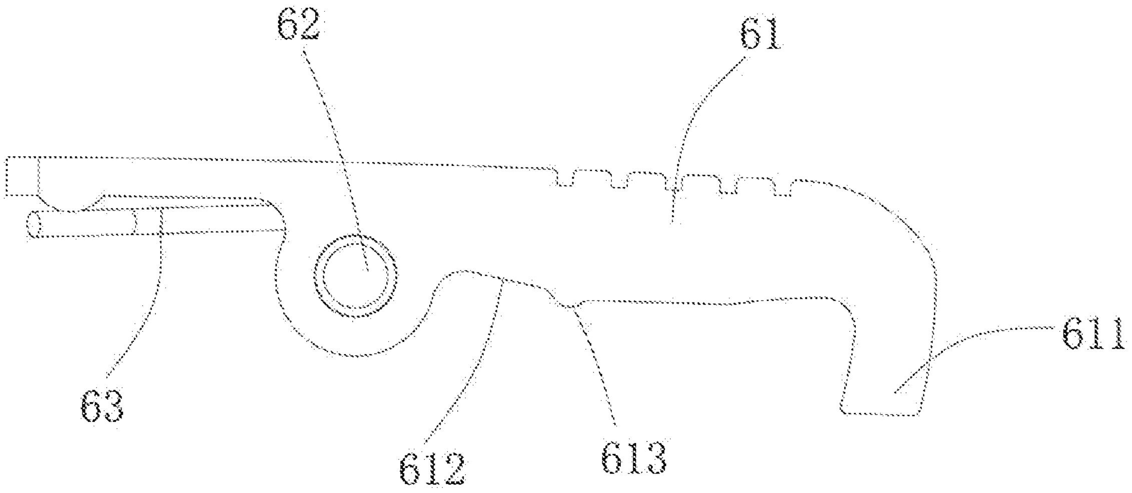
FIG. 12 is a schematic structural diagram of the position-limiting mechanism of the present invention.
Figure 13:
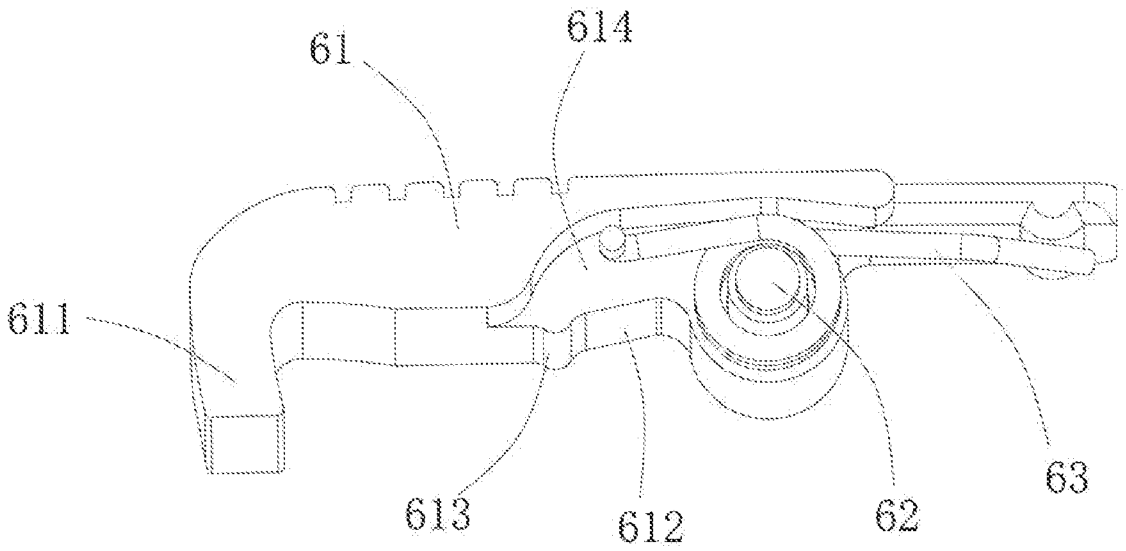
FIG. 13 is another schematic structural schematic diagram of the position-limiting mechanism of the present invention.

In one embodiment, as best shown in FIG. 12, the position-limiting mechanism 6 comprises a position-limiting body 61, a through hole 64, and a pivotal pin 62, and a biasing member 63. The position-limiting body 61 has a first end 601 and a second end 602. The first end 601 of the position-limiting body 61 corresponds to the proximal end 301 of the at least one implement 3, while the second end 602 of the position-limiting body 61 corresponds to the distal end 302 of the at least one implement 3. In a preferred embodiment, the first position-limiting portion 611 is an elongated portion that laterally extends from the first end 601 of the position-limiting body 61, and the second position-limiting portion 33 of the at least one implement 3 is a groove having a complementary shape to the elongated portion. The through hole 64 is positioned closer to the second end 602 of the position-limiting body 61 than the first end 601 of the position-limiting body 61. The pivotal pin 62 runs through the through hole 64 such that the position-limiting body 61 is rotatable about the pivotal pin 62.

The biasing member 63 is configured to urge the first end 601 of the position-limiting body 61 towards the at least one implement 3. In this way, the first position-limiting portion 611 has a tendency to engage the second position-limiting portion 33 without any external forces, so as to keep the at least one implement 3 in its second position, i.e., the unfolded position. The biasing member 63 is preferably a torsion spring that is installed on the pivotal pin 62, with one end engaging the first end 601 of the position-limiting body 61 and with the other end anchored to the handle 1. In one embodiment, the position-limiting body 61 further comprises a thickness-reduced portion 614 to receive the torsion spring.

The pivotal shaft 2 is configured to allow the at least one implement 3 to pivot between the first position and the second position. The pivotal shaft 2 is a D-shaped shaft comprising a flat surface 21 and an arc surface 22. The pivotal hole 31 of the at least one implement 3 is provided with a notch 32. The notch 32 is preferably formed by two parallel side edges. A width of the notch 32 is smaller than a diameter of the pivotal hole 31. Moreover, the diameter of the pivotal hole 32 is equivalent to or slightly greater than a diameter 221 of the pivotal shaft 2, and the width of the notch 32 is equivalent to or slightly greater than a distance 211 from a peak of the arc surface 22 to the flat surface 21 of the pivotal shaft 2. In this configuration, only if the flat surface 21 is parallel with the side edges of the notch 32, the at least one implement 3 could slide out and detach from the pivotal shaft 2.

In one embodiment, the position-limiting mechanism 6 is movable to a disengaging position where the first position-limiting portion 611 of the position-limiting mechanism 6 disengages the second position-limiting portion 33 of the at least one implement 3. The position-limiting mechanism 6 is further movable to a replacement position after the first position-limiting portion 611 of the position-limiting mechanism 6 disengages the second position-limiting portion 33 of the at least one implement 3, allowing the at least one implement 3 to detach from the pivotal shaft 2 by pivoting to a position where the flat surface 21 of the pivot shaft 2 is parallel with side edges of the notch 32.

Figure 6:
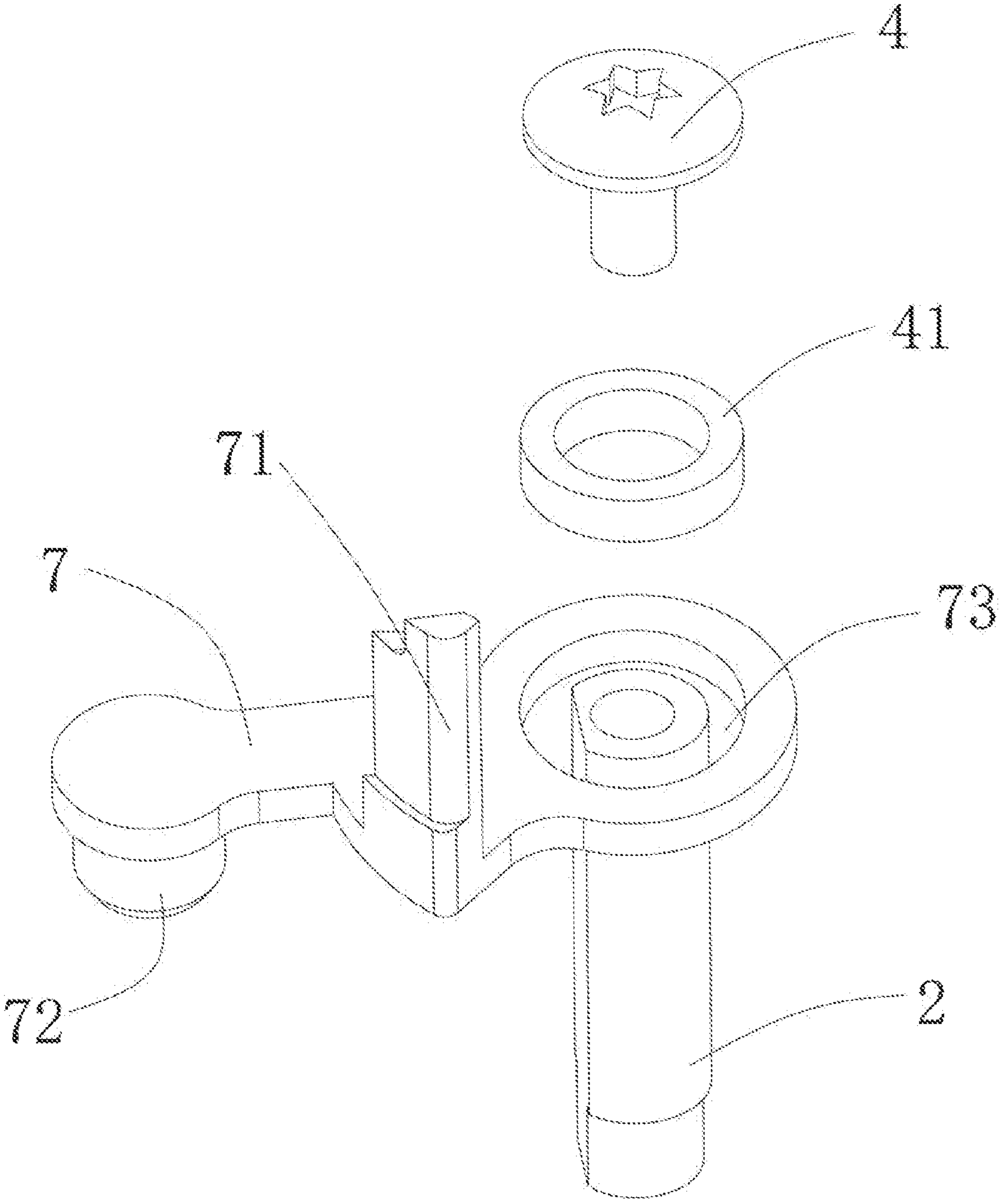
FIG. 6 is a schematic structural diagram of the connection between the rotating member and the pivotal shaft of the present invention.
Figure 7:
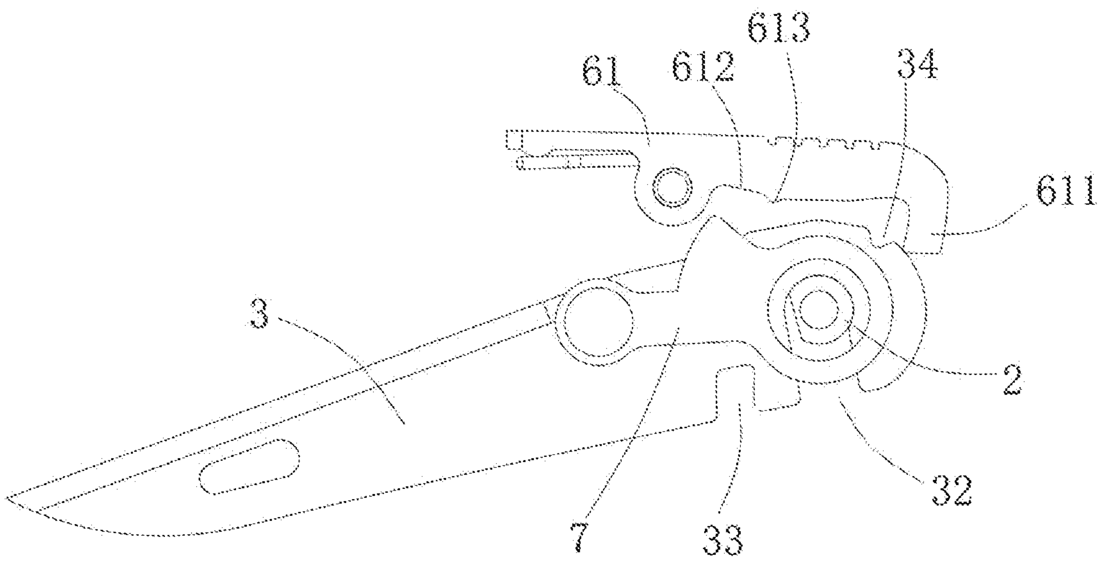
FIG. 7 is a schematic structural diagram of the present invention wherein the handle is omitted, and the implement is rotated counterclockwise from the first position.

The position-limiting mechanism 6 may be moved via any suitable means known in the art. In a preferred embodiment, the tool assembly further comprises a rotating member 7. The rotating member 7 may be operated by a user to move or rotate the position-limiting mechanism 6. As shown in FIGS. 6-7, the rotating member 7 comprises a pushing portion 71 which pushes the at least one implement 3 away from the storage compartment 14 when the rotating member 7 rotates in a first direction, i.e., a counterclockwise direction in FIG. 7. This will push the at least one implement 3 to pivot a small angle from its first position. Then the user may pinch the at least one implement 3 to unfold it to the second position. As mentioned above, once the at least one implement 3 reaches the second position, the first position-limiting portion 611 of the position-limiting mechanism 6 engages the second position-limiting portion 33 of the at least one implement 3 to lock the at least one implement 3 in position.

Figure 8:
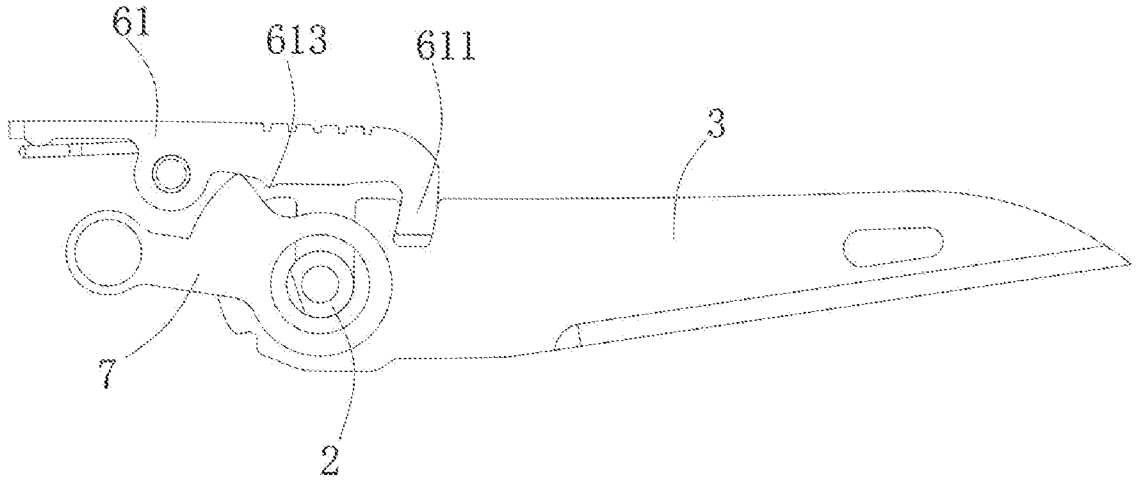
FIG. 8 is a schematic structural diagram of the implement of the present invention with the implement in the second position.
Figure 9:
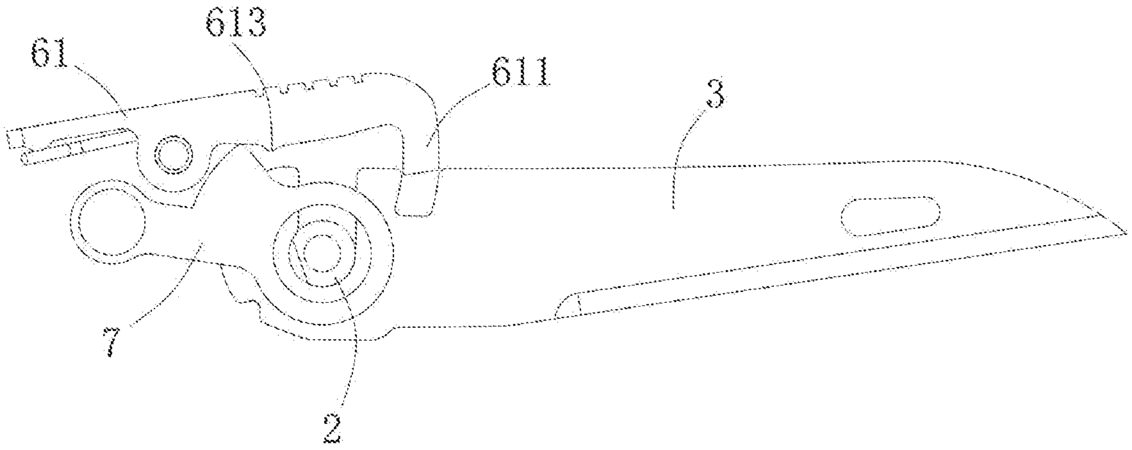
FIG. 9 is a schematic structural view of the present invention when the first position-limiting portion is lifted to a disengaging position.
Figure 10:
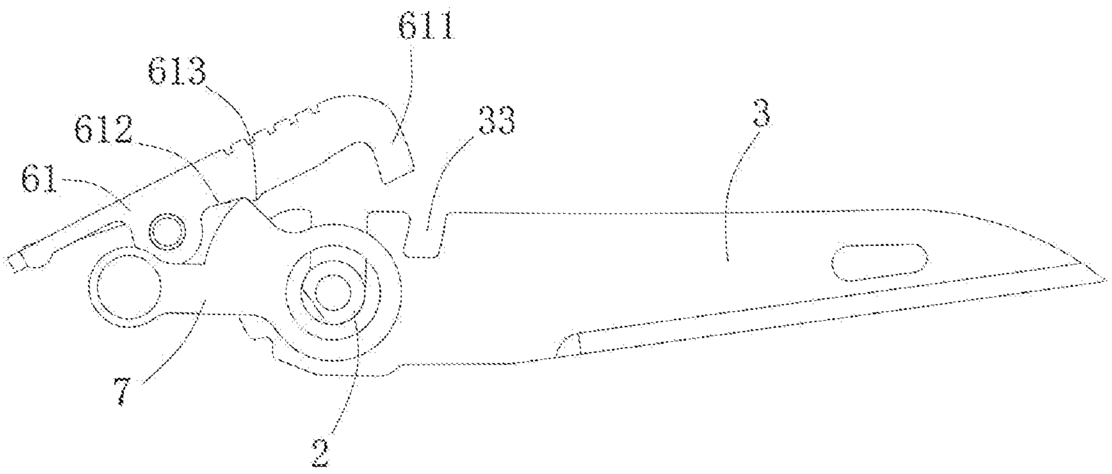
FIG. 10 is a schematic structural view of the present invention when the first position-limiting portion is lifted to a replacement position.
Figure 11:
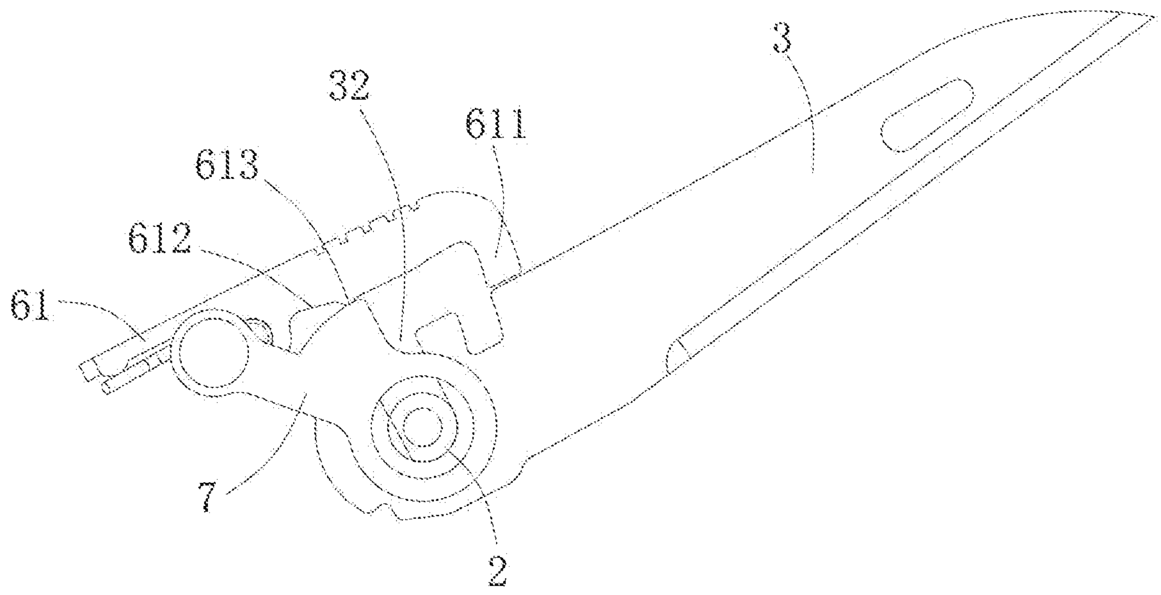
FIG. 11 is a schematic structural view of the present invention when the first position-limiting partition is lifted to the replacement position, and the implement is rotated to a position where it can detach from the pivotal shaft.

When the rotating member 7 rotates in a second direction (i.e., a clockwise direction), the pushing portion 71 pushes the position-limiting mechanism 6 to the disengaging position so that the first position-limiting portion 611 of the position-limiting mechanism 6 disengages the second position-limiting portion 33 of the at least one implement 3, as shown in FIGS. 8-9. The pushing portion 71 is further configured to further push the position-limiting mechanism 6 to the replacement position when the rotating member 7 rotates further in the second direction, as shown in FIG. 10. This will allow the at least one implement 3 to pivot to a position where the flat surface of 21 the pivot shaft 2 is parallel with the side edges of the notch 32, such that the at least one implement 3 can detach from the pivotal shaft 2, as shown in FIG. 11.

In a preferred embodiment, the position-limiting mechanism 6 further comprises a lifting portion 612 configured to engage the pushing portion 71 of the rotating member 7. The lifting portion 71 is located between the pivotal pin 62 and the first end 601 of the position-limiting body 61. Moreover, the lifting portion 612 may further comprise a locking protrusion 613 configured to hold the rotating member 7 in position when the locking protrusion 613 engages the pushing portion 71 of the rotating member 7, as shown in FIG. 11. In this embodiment, a surface of the pushing portion 71 that engages the locking protrusion 613 and a surface of the locking protrusion 613 are both arc surfaces such that the locking protrusion 613 applies a force to the pushing portion 71 in a direction directed to an axis of the pivotal shaft 2 or to the right side of the axis of the pivotal shaft 2, thereby preventing the rotating member 7 from rotating. In this configuration, the user can easily replace or change the at least one implement 3.

In one embodiment, the handle 1 comprises an inner handle plate 11 and an outer handle plate 13. Preferably, the inner handle plate comprises a pair of inner handle plates 11, and the outer handle plate comprises a pair of outer handle plates 13. The pair of inner handle plates 11 may be connected by a connecting plate 12. The storage compartment 14 is formed within the pair of inner handle plates. Moreover, each inner handle plate 11 comprises a D-shaped mounting hole 113 for the pivotal shaft 2 to travel therethrough. The D-shaped mounting holes match the D-shaped pivotal shaft 2 to prevent the pivotal shaft 2 from pivoting.

Each outer handle plate 13 is attached to one of the pair of inner handle plates via a screw 4 attached to an end of the pivotal shaft 2, respectively. In a preferred embodiment, the D-shaped mounting holes are located adjacent to the first end 101 of the handle 1. At the second end 102 of the handle 1, the pair of outer handle plates 13 may be connected to the pair of inner handle plates 11 by a fastener 5. In a preferred embodiment, each inner handle plates 11 further comprises a pivotal pin mounting hole 114 to install the pivotal pin 62 of the position-limiting mechanism 6.

The rotating member 7 may be disposed between the pair of inner handle plates 11 and one of the pair of outer handle plates 13. The rotating member 7 further comprises a mounting hole 73 through which the pivotal shaft 2 travels. Moreover, one of the pair of inner handle plates 11, which is closer to the rotating member 7, comprises a first slot 111 at a location corresponding to the pushing portion 71 of the rotating member 7, as shown in FIGS. 1 and 6. In one embodiment, the first slot 111 is a curved slot. Moreover, when the position limiting mechanism 6 is pushed to the replacement position as shown in FIG. 11, the first slot 111, together with the locking protrusion 613, will facilitate holding the rotating member 7 in position.

In one embodiment, as shown in FIGS. 2 and 6, the rotating member 7 further comprises a toggle portion 72 that extends in an opposite direction to the pushing portion of the rotating member. The one of the pair of outer handle plates further comprises a second slot 131 at a location corresponding to the toggle portion 72 of the rotating member 7. The second slot 131 is a curved slot to allow the user to rotate the rotating member 7. An inner diameter of the mounting hole 73 is greater than the diameter 221 of the pivotal shaft 2. In this embodiment, the rotating member 7 further comprises a bearing 41 installed in the mounting hole to facilitate rotation of the rotating member 7 as shown in FIG. 6.

Figure 16:
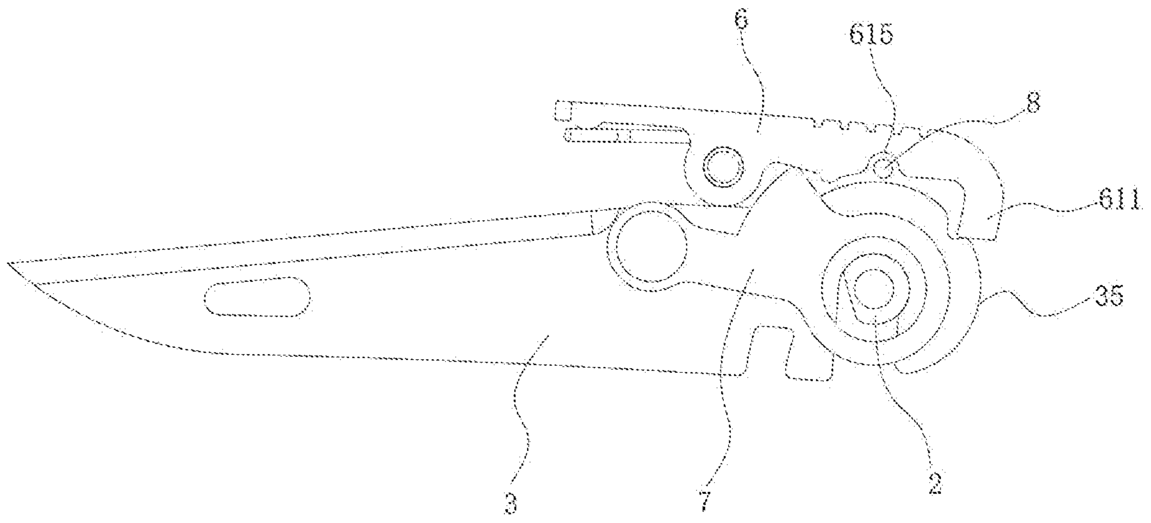
FIG. 16 is a schematic structural diagram of a further embodiment of the present invention.
Figure 17:
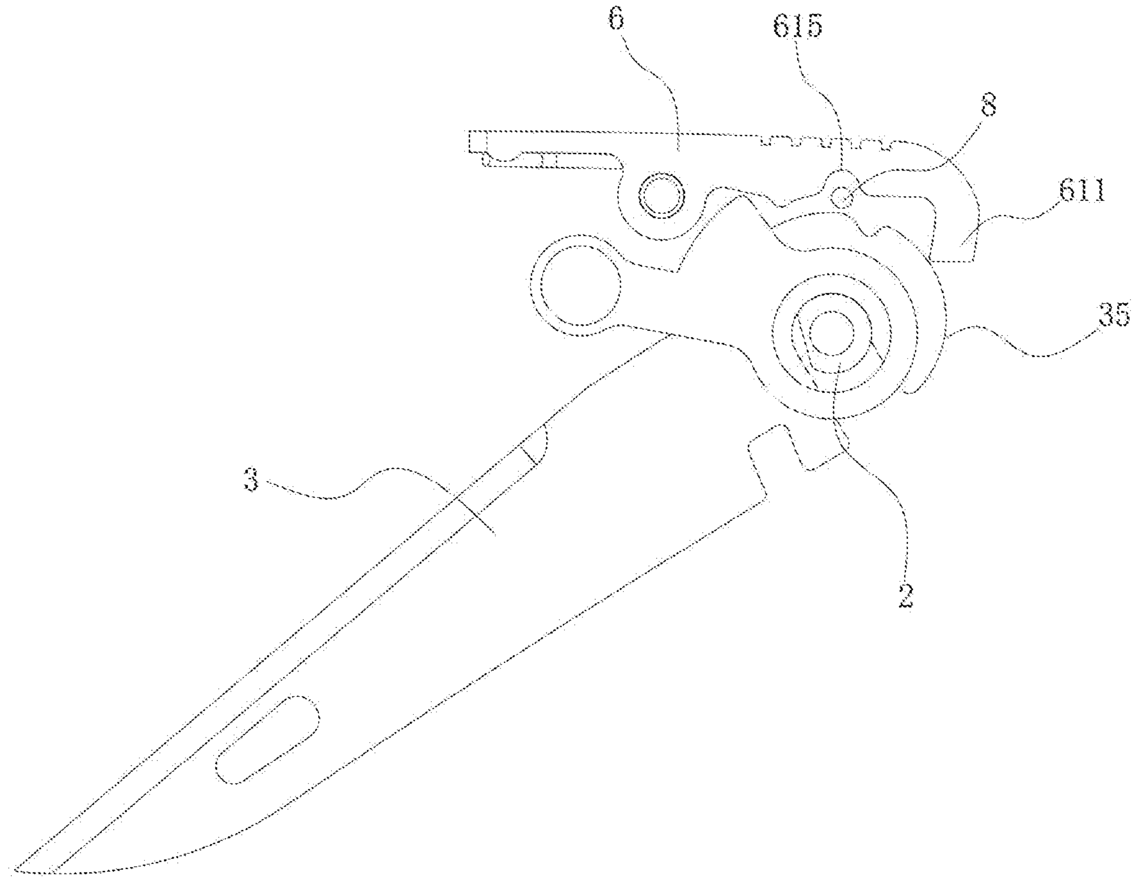
FIG. 17 is a schematic structural diagram of the implement between the first position and the second position according to the embodiment in FIG. 16.

In a preferred embodiment shown in FIGS. 16-17, the handle 1 further comprises a position-limiting pin 8 disposed between the position-limiting mechanism 6 and the proximal end 301 of the at least one implement 3. Two ends of the position-limiting pin 8 may be connected to the pair of inner handle plates 11 respectively. The position-limiting pin 8 is further disposed between the first end 601 of the position-limiting body 61 and the locking protrusion 613 of the position-limiting mechanism 6. A profile surface 35 of the at least one implement 1 is preferably an arc surface that is concentric with the pivotal shaft. In this way, the distance between the profile surface 35 and the position-limiting pin 8 remains unchanged when the at leant one implement 3 pivots between the first position and the second position. Therefore, the position-limiting pin 8 cooperates with the profile surface 35 to prevent the at least one implement 3 from deviating from the pivot axis 2 when pivoting. In order to ensure that the at least one implement 3 will not deviate due to the gap between the pivotal hole 31 and the outer contour of the pivotal shaft 2, the distance between the position-limiting pin 8 and the profile surface 35 needs to be relatively small. Preferably, the position-limiting pin 8 and the profile surface 35 almost abut against each other. In a preferred embodiment, the position-limiting mechanism 6 further comprises an arc groove 615 to accommodate the position-limiting pin 8. The arc groove 615 may prevent the position-limiting pin 8 from interfering with the position-limiting mechanism 6 and ensure that the first position-limiting portion 611 of the position-limiting mechanism 6 can engage the profile surface 35 of the at least one implement 3.

Figure 5:
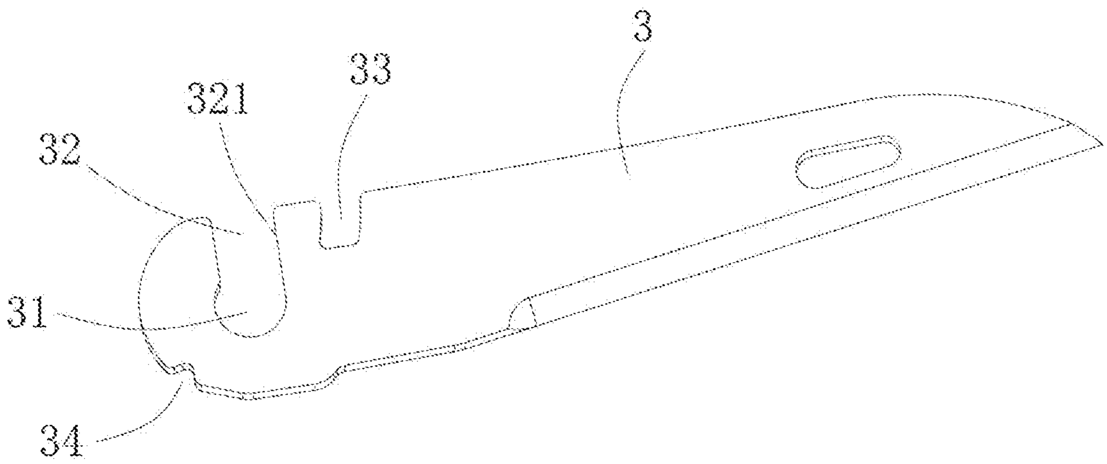
FIG. 5 is a schematic structural diagram of the implement of the present invention, which is a blade.
Figure 14:
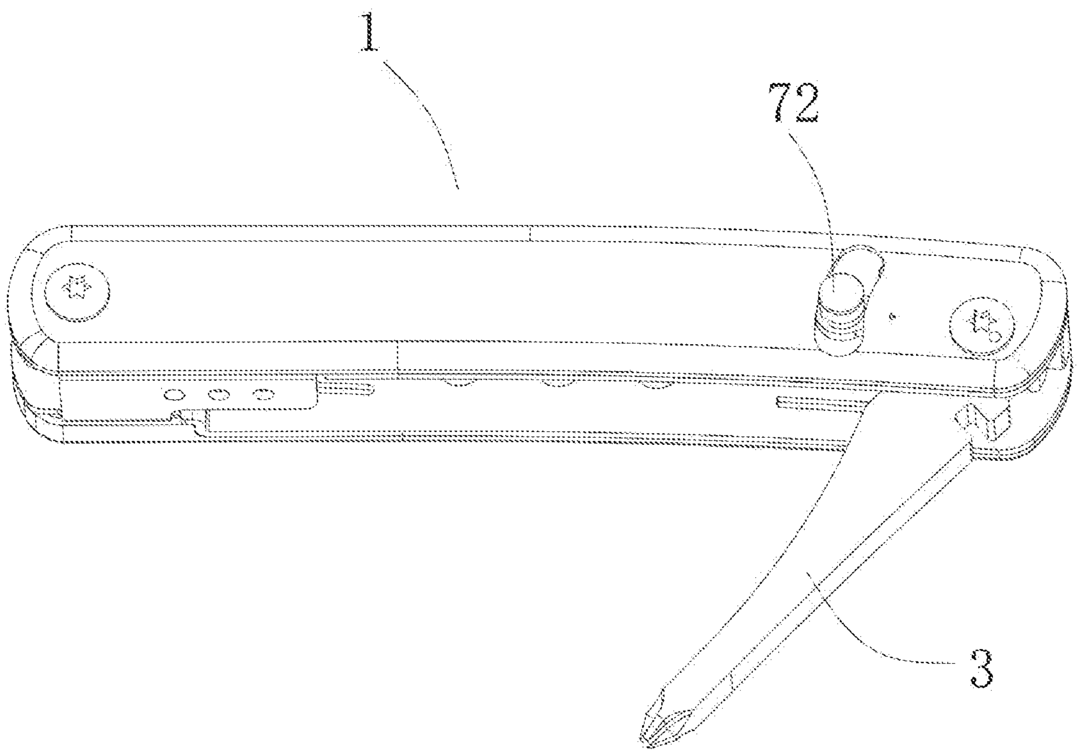
FIG. 14 is a schematic structural diagram of another embodiment of the present invention.
Figure 15:
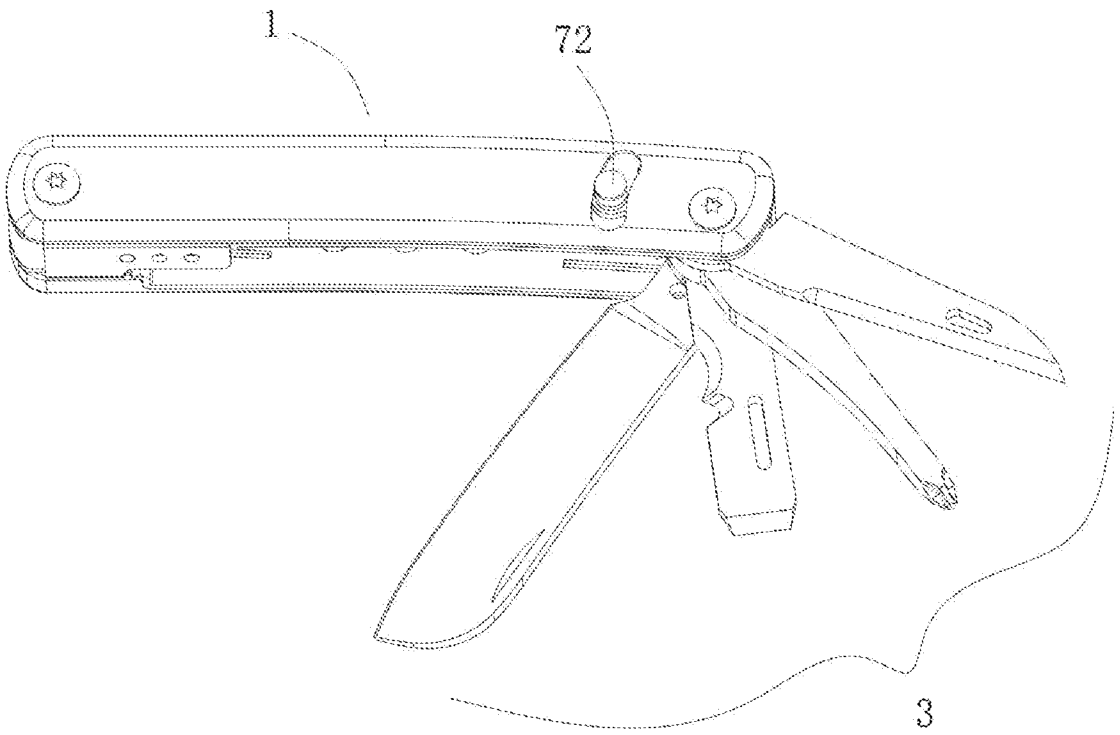
FIG. 15 is a schematic structural diagram of yet another embodiment of the present invention.

The configuration of the present invention allows the user to replace or change the at least one implement 3. The at least one implement 3 may be any type or kind of the implement, such as a blade (FIG. 5), a cross bit (FIG. 14), saws, files, screwdrivers, scissors, etc. As shown in FIG. 15, the present invention also enables multiple implements to be attached simultaneously.

Figure 20:
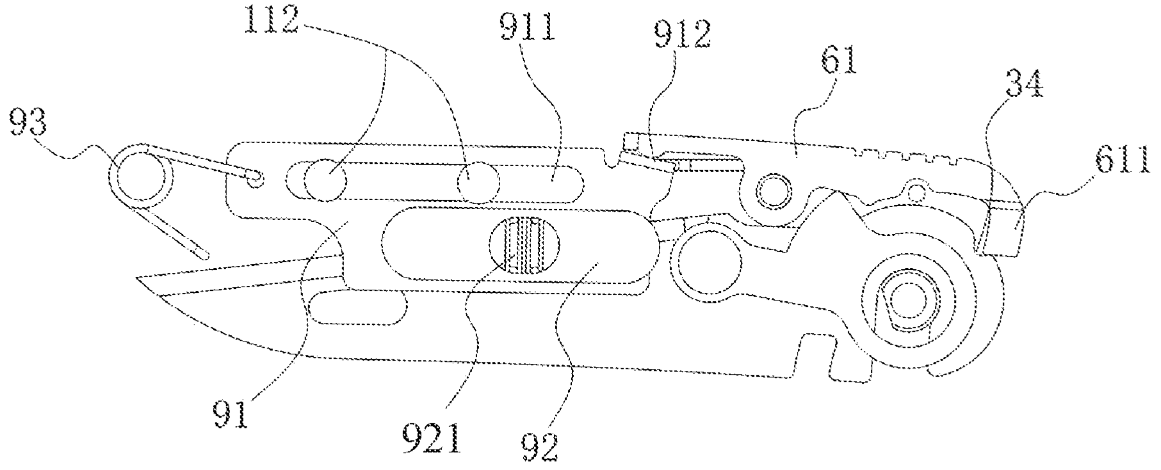
FIG. 20 is a schematic structural diagram of the present invention, wherein the safety mechanism engages the position-limiting mechanism.

In an embodiment illustrated in FIGS. 18-21, the handle further comprises a safety mechanism 9 that engages the position-limiting mechanism 6 when the at least one implement 3 is in the first position to hold the position-limiting mechanism 6 in a position that prevents the first position-limiting portion 611 of the position-limiting mechanism 6 from disengaging the third position-limiting portion 34 of the at least one implement. This will prevent the at least one implement 3 from accidentally unfolding, as shown in FIG. 20. The safety mechanism 9 may slide to disengage the position-limiting mechanism 6. Then the position-limiting mechanism 6 can be pushed to rotate counterclockwise, allowing the at least one implement 3 to unfold as mentioned above.

Figure 18:
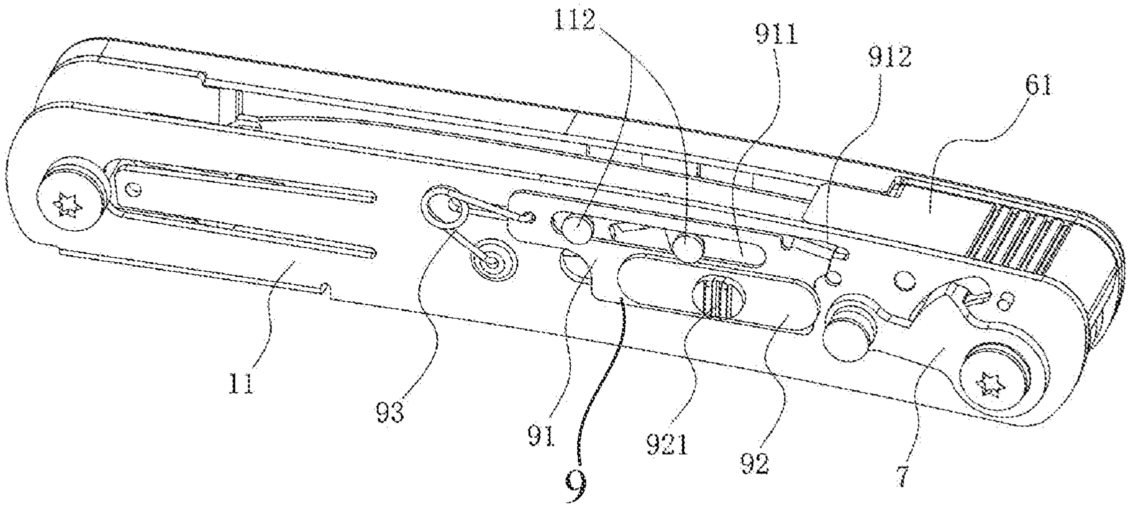
FIG. 18 is a schematic structural diagram of a safety mechanism of the present invention.
Figure 19:
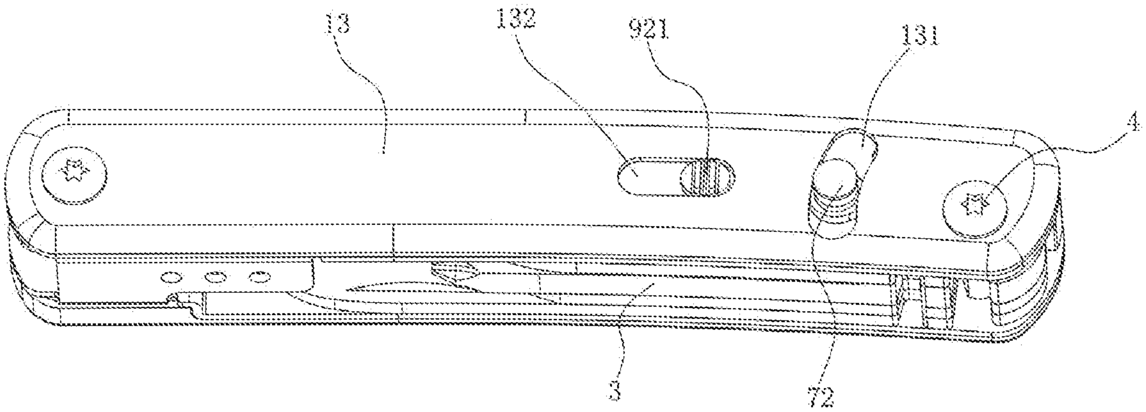
FIG. 19 is a schematic diagram of the structure of the present invention equipped with the safety mechanism.
Figure 21:
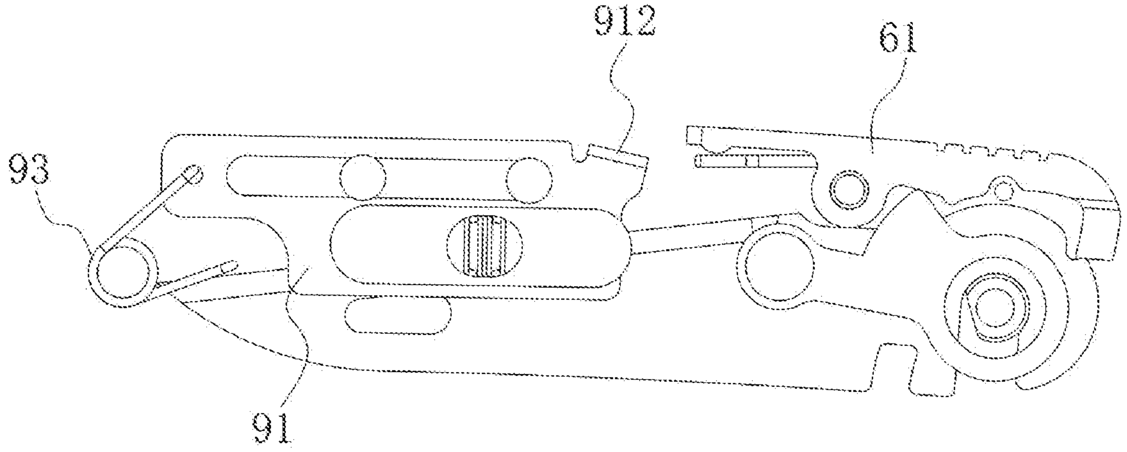
FIG. 21 is a schematic structural diagram of the present invention, wherein the safety mechanism disengages the position-limiting mechanism.

The safety mechanism 9 comprises a sliding plate 91 and a pushing plate 92. The sliding plate comprises a sliding slot 911. The pair of inner handle plates may be provided with a plurality of slide guiding members 112, which are arranged in the sliding slot 911 to allow the sliding plate 91 to slidably coupled to the plurality of slide guiding members 112, as shown in FIGS. 18 and 20-21. The sliding plate 91 is movable towards and away from the first end 101 of the handle 1. The sliding plate 91 further comprises a stopping portion 912 configured to engage the second end 602 of the position-limiting mechanism 6 when the sliding plate 91 moves towards the first end 101 of the handle 1 and disengage the second end 602 of the position-limiting mechanism 6 when the sliding plate 91 moves away from the first end 101 of the handle 1. In one embodiment, the stopping portion 912 is inwardly inclined.

In one embodiment, the safety mechanism 9 further comprises a reset spring 93 that provides an elastic force to urge the sliding plate 91 to move towards the first end 101 of the handle 1. In a preferred embodiment, the safety mechanism 9 further comprises a pushing plate 92 that connects to an outer side of the sliding plate 91. The pushing plate comprises a pushing button 921, and one of the pair of outer handle plates comprises a third slot 132 at a location corresponding to the pushing button 921, allowing the user to operate the safety mechanism.

Although the disclosure has been explained in relation to its preferred embodiment, it is to be understood that many other possible modifications and variations can be made without departing from the spirit and scope of the disclosure.

What is claimed is:

1. A tool assembly comprising:

a handle having a first end and a second end;

a pivotal shaft mounted in the first end of the handle;

at least one implement having a proximal end and a distal end;

a position-limiting mechanism mounted in the handle;

a rotating member;

the at least one implement comprising a pivotal hole at the proximal end;

the pivotal shaft running through the pivotal hole to attach the at least one implement such that the at least one implement is pivotable about the pivotal shaft between a first position and a second position;

the handle comprising a storage compartment to receive the at least one implement in the first position;

the position-limiting mechanism comprising a first position-limiting portion;

the at least one implement comprising a second position-limiting portion adjacent to the proximal end of the at least one implement;

the first position-limiting portion engaging the second position-limiting portion to prevent the at least one implement in the second position from pivoting;

the pivotal shaft being a D-shaped shaft comprising a flat surface and an arc surface;

the pivotal hole being provided with a notch;

a width of the notch being smaller than a diameter of the pivotal hole;

the diameter of the pivotal hole being equivalent to or slightly greater than a diameter of the pivotal shaft;

the width of the notch being equivalent to or slightly greater than a distance from a peak of the arc surface to the flat surface of the pivotal shaft;

wherein the position-limiting mechanism is movable to a disengaging position where the first position-limiting portion of the position-limiting mechanism disengages the second position-limiting portion of the at least one implement; and wherein the position-limiting mechanism is further movable to a replacement position after the first position-limiting portion of the position-limiting mechanism disengages the second position-limiting portion of the at least one implement, allowing the at least one implement to detach from the pivotal shaft by pivoting to a position where the flat surface of the pivot shaft is parallel with side edges of the notch;

wherein the position-limiting mechanism comprises a position-limiting body, a through hole, and a pivotal pin, and a biasing member, the position-limiting body having a first end and a second end, the through hole being positioned closer to the second end of the position-limiting body than the first end of the position-limiting body, the pivotal pin running through the through hole such that the position-limiting body is rotatable about the pivotal pin, the biasing member being configured to urge the first end of the position-limiting body towards the at least one implement wherein the rotating member comprises a pushing portion which pushes the at least one implement away from the storage compartment when the rotating member rotates in a first direction; and wherein the pushing portion is further configured to push the position-limiting mechanism to the disengaging position when the rotating member rotates in a second direction and push the position-limiting mechanism to the replacement position when the rotating member rotates further in the second direction.

2. The tool assembly as claimed in claim 1, wherein the first position-limiting portion is an elongated portion that laterally extends from the first end of the position-limiting body, while the second position-limiting portion is a groove having a complementary shape to the elongated portion.

3. The tool assembly as claimed in claim 1, wherein the biasing member is a torsion spring that is installed on the pivotal pin, with one end engaging the first end of the position-limiting body and with the other end anchored to the handle.

4. The tool assembly as claimed in claim 1, wherein the position-limiting mechanism further comprises a lifting portion configured to engage the pushing portion of the rotating member, the lifting portion is located between the pivotal pin and the first end of the position-limiting body, and wherein the lifting portion further comprises a locking protrusion configured to hold the rotating member in position when the locking protrusion engages the pushing portion of the rotating member.

5. The tool assembly as claimed in claim 4, wherein a surface of the pushing portion that engages the locking protrusion and a surface of the locking protrusion are both arc surfaces.

6. The tool assembly as claimed in claim 4, wherein the handle further comprises a position-limiting pin disposed between the position-limiting mechanism and the proximal end of the at least one implement, the position-limiting pin being further disposed between the first end of the position-limiting body and the locking protrusion of the position-limiting mechanism, a profile surface of the at least one implement being an arc surface that is concentric with the pivotal shaft.

7. The tool assembly as claimed in claim 6, wherein the position-limiting mechanism further comprises an arc groove to accommodate the position-limiting pin.

8. The tool assembly as claimed in claim 1, wherein the handle comprises a pair of inner handle plates and a pair of outer handle plates, the pair of inner handle plates being connected together by a connecting plate, the storage compartment being formed within the pair of inner handle plates, each inner handle plate comprising a D-shaped mounting hole for the pivotal shaft to travel therethrough, each outer handle plate being attached to one of the pair of inner handle plates via a screw attached to an end of the pivotal shaft.

9. The tool assembly as claimed in claim 8, wherein the pair of inner handle plates further comprises a pivotal pin mounting hole to install the pivotal pin of the position-limiting mechanism.

10. The tool assembly as claimed in claim 8, wherein the rotating member is disposed between the pair of inner handle plates and one of the pair of outer handle plates, the rotating member further comprising a mounting hole through which the pivotal shaft travels, one of the pair of inner handle plates further comprising a first slot at a location corresponding to the pushing portion of the rotating member.

11. The tool assembly as claimed in claim 10, wherein the rotating member further comprises a toggle portion that extends in an opposite direction to the pushing portion of the rotating member, the one of the pair of outer handle plates further comprising a second slot at a location corresponding to the toggle portion of the rotating member.

12. The tool assembly as claimed in claim 10, wherein an inner diameter of the mounting hole is greater than the diameter of the pivotal shaft, and the rotating member further comprises a bearing installed in the mounting hole to facilitate rotation of the rotating member.

13. The tool assembly as claimed in claim 8, wherein the at least one implement further comprises a third position-limiting portion at the proximal end of the at least one implement, the first position-limiting portion of the position-limiting mechanism engaging the third position-limiting portion of the at least one implement when the at least one implement is in the first position.

14. The tool assembly as claimed in claim 13, wherein the handle further comprises a safety mechanism that engages the position-limiting mechanism when the at least one implement is in the first position to hold the position-limiting mechanism in a position that prevents the first position-limiting portion of the position-limiting mechanism from disengaging the third position-limiting portion of the at least one implement.

15. The tool assembly as claimed in claim 14, wherein the safety mechanism comprises a sliding plate and a pushing plate, the sliding plate comprising a sliding slot, the pair of inner handle plates being provided with a plurality of slide guiding members, the plurality of slide guiding members being arranged in the sliding slot to allow the sliding plate to slidably coupled to the plurality of slide guiding members, the sliding plate being movable towards and away from the first end of the handle, the sliding plate further comprising a stopping portion configured to engage the second end of the position-limiting mechanism when the sliding plate moves towards the first end of the handle and disengage the second end of the position-limiting mechanism when the sliding plate moves away from the first end of the handle.

16. The tool assembly as claimed in claim 15, wherein the safety mechanism further comprises a reset spring that provides an elastic force to urge the sliding plate to move towards the first end of the handle.

17. The tool assembly as claimed in claim 16, wherein the safety mechanism further comprises a pushing plate that connects to an outer side of the sliding plate, the pushing plate comprising a pushing button, one of the pair of outer handle plates comprising a third slot at a location corresponding to the pushing button.

18. The tool assembly as claimed in claim 17, wherein the stopping portion is inwardly inclined.

* * * * *